J. E. GLOEKLER & A. B. STAHL.
POTATO MASHER.
APPLICATION FILED FEB. 15, 1909.
930,070.
Patented Aug. 3, 1909.
2 SHEETS—SHEET 1.
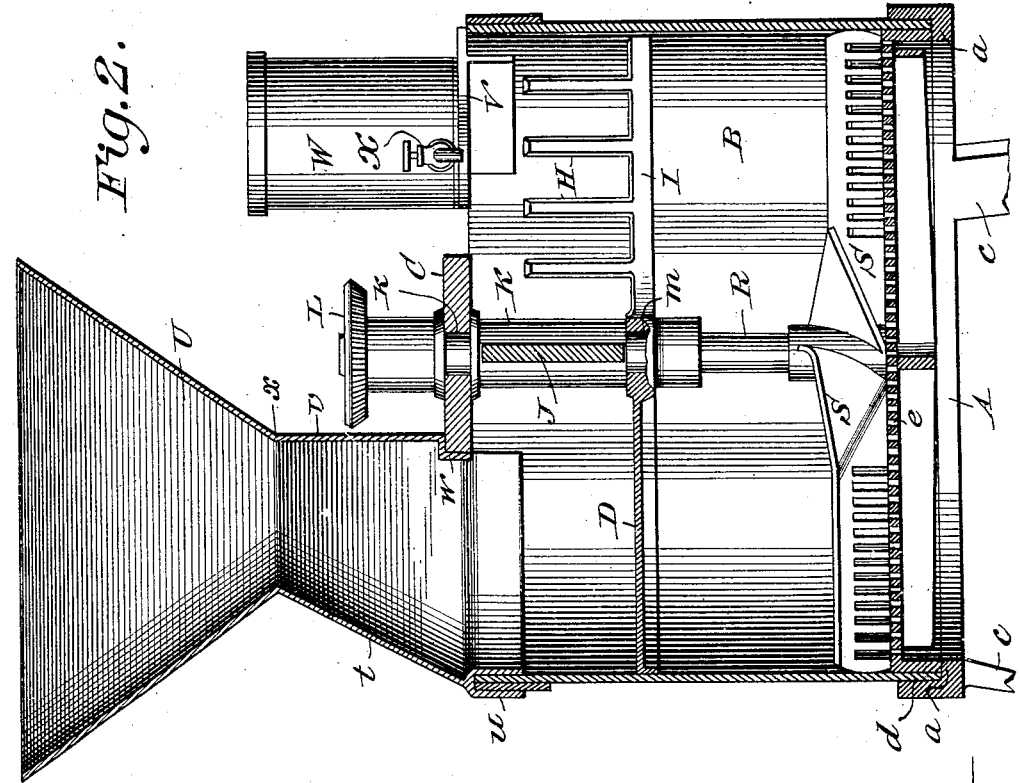
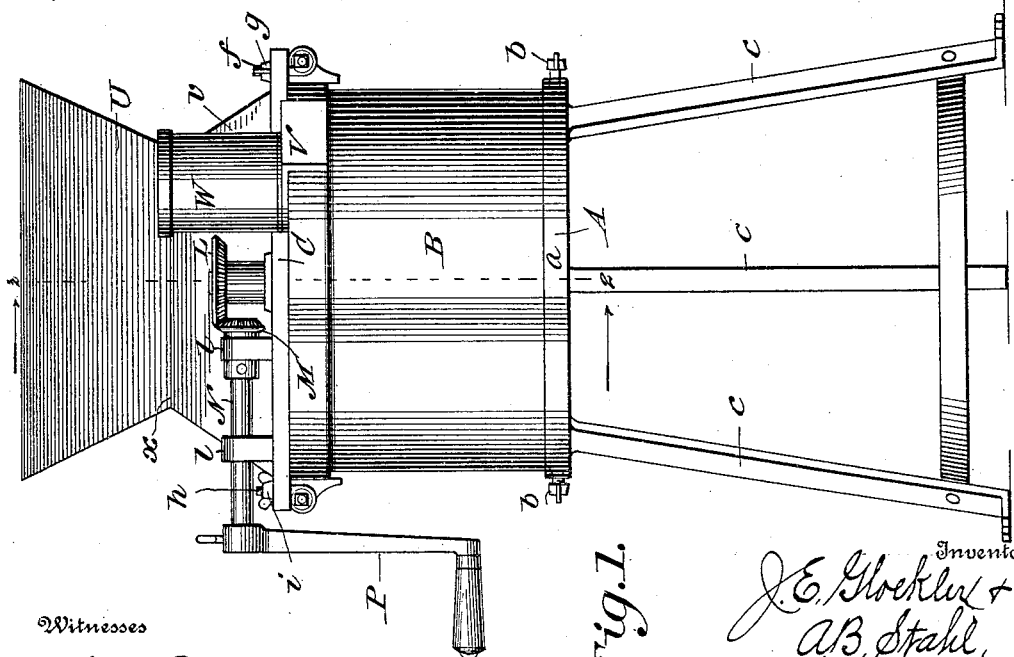

J. E. GLOEKLER & A. B. STAHL.
POTATO MASHER.
APPLICATION FILED FEB. 15, 1909.
930,070.
Patented Aug. 3, 1909.
2 SHEETS—SHEET 2.
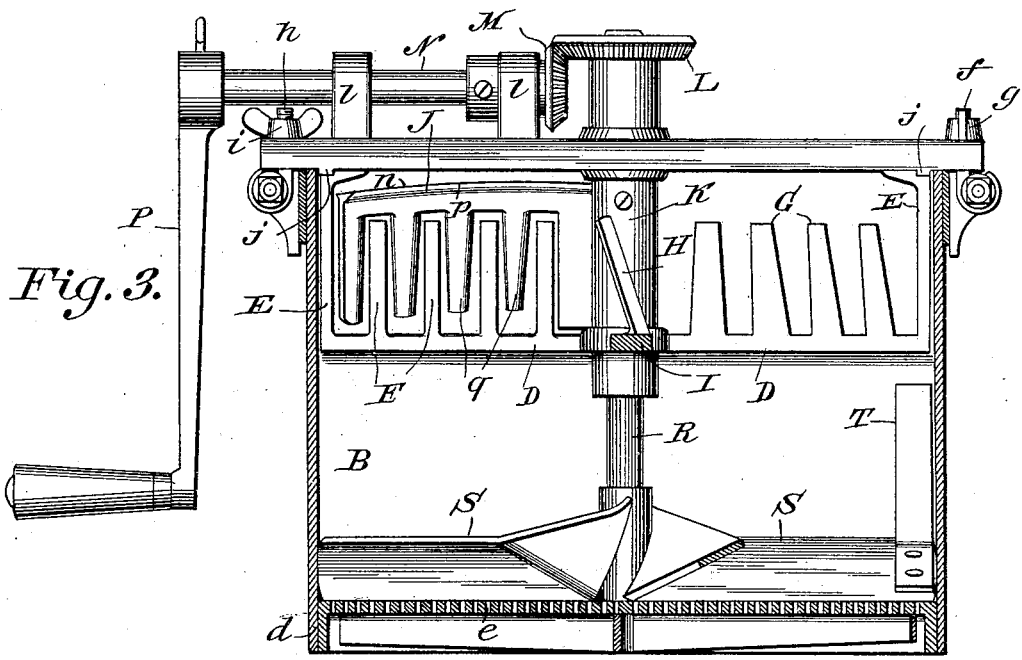
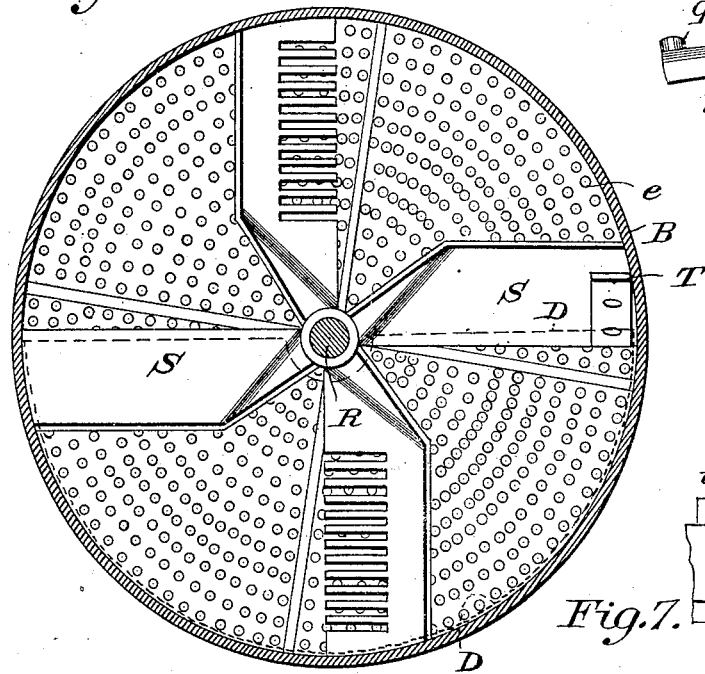
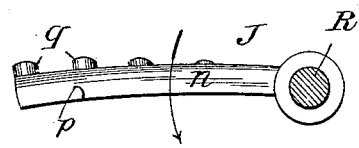
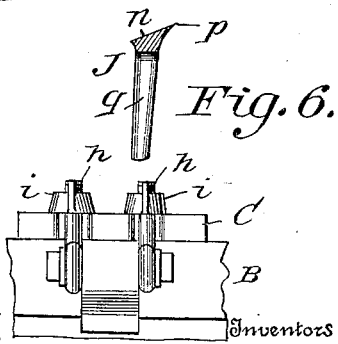
Witnesses
Phil E. Barnes
W. C. Akaly
Inventors
J. E. Gloekler &
A. B. Stahl.
By James J. Shuhy
Attorney

UNITED STATES PATENT OFFICE.

JOHN EDWARD GLOEKLER AND ALFRED B. STAHL, OF PITTSBURG, PENNSYLVANIA.

POTATO-MASHER.

No. 930,070.            Specification of Letters Patent.            Patented Aug. 3, 1909.

Application filed February 15, 1909. Serial No. 477,856.

*To all whom it may concern:*

Be it known that we, JOHN EDWARD GLOEKLER and ALFRED B. STAHL, citizens of the United States, residing at Pittsburg, in the county of Allegheny and State of Pennsylvania, have invented new and useful Improvements in Potato-Mashers, of which the following is a specification.

Our present invention has to do with the reduction of potatoes and the like to a mashed state.

The general object of our present invention is to provide an efficient machine, adapted to first break and then mash the potatoes, and one constructed in such manner that its parts may be expeditiously and easily disassembled to facilitate thorough cleaning thereof, and may as readily be reassembled by persons unfamiliar with machinery.

Another object of the invention is the provision in a potato mashing machine, of means for breaking the potatoes so as to render easy the subsequent mashing thereof, and means for cleaning the movable part of the breaking means during the operation of the machine, this latter with a view of preventing choking and in that way maintaining the efficiency of the machine from the start to the finish of the mashing operation.

Another object is the provision in a machine for the purpose stated, of a peculiar and advantageous hopper constructed in such manner that it is not liable to choke, and hence is adapted to assure the feed of a uniform volume of potatoes to the moving part of the breaking means.

Other objects and advantageous characteristics of our invention will be fully understood from the following description and claims when the same are read in connection with the drawings, accompanying and forming part of this specification, in which:

Figure 1 is an elevation of the machine constituting the best practical embodiment of our invention of which we are cognizant. Fig. 2 is an enlarged detail section taken through the receptacle and its appurtenances in the plane indicated by the line 2—2 of Fig. 1. Fig. 3 is a section taken through the receptacle and showing certain parts in elevation. Fig. 4 is a horizontal section taken through the receptacle in a plane below the platform D that is maintained therein but showing by dotted lines the comparative area of the said platform D relatively to the horizontal cross-section of the receptacle B. Fig. 5 is a detail horizontal section taken in a plane above and illustrating the sweep comprised in our improvement. Fig. 6 is a detail view, taken at a right angle to Fig. 5, and showing the shape in cross-section of the bar of the sweep. Fig. 7 is a detail view, taken at a right angle to Fig. 3 and showing the manner of connecting one end of the crown bar with the receptacle.

Similar letters of reference designate corresponding parts in all of the views of the drawings.

In the present and best practical embodiment of our invention of which we are cognizant, we prefer to employ a stand having a body-band A on which is a flange $a$ and one or more set screws $b$, and legs $c$ supporting said body-band and adapted to be bolted or otherwise fixedly connected to a floor or other support. We also prefer to removably arrange the receptacle B of our improvement in the body-band of the stand so that the exterior flange $d$ of the receptacle bears on the flange $a$ of the band, and so that when desired the receptacle may be readily lifted from the body-band A and as readily replaced therein.

The receptacle B is provided with a foraminous bottom $e$, preferably such as shown, and its interior is entirely free from projections, this in order that when the working parts are lifted out as a unit, as presently described, the receptacle may be quickly and thoroughly cleaned. Exteriorly the receptacle is provided at one side with a swinging bolt $f$ on which is a wing-nut $g$, and at its opposite side with two swinging bolts $h$, bearing wing nuts $i$; the purpose of this provision being to compel careless help to replace the working parts in the proper manner in the receptacle.

A single frame carries all of the working parts of the machine and is removable with said parts from the receptacle B; and by reference to the drawings it will be readily understood that said frame comprises a crown bar C having one notch in one end and two notches in its opposite end to receive the before-mentioned bolts $f$ and $h$, and also having interior flanges $j$, a vertical central aperture $k$ and standards $l$, a platform D arranged about the proportional distance illustrated below the crown bar C, and fixedly connected with said crown bar through the medium of hangers E, and having a vertical central aperture $m$ disposed below the aperture $k$, breaking fingers F fixed to and rising from the platform D, at intervals between the aperture *m* and one of the hangers E, cleaning fingers G fixed to and rising from the platform at intervals between the aperture *m* and the other hanger E, and a series of cleaning fingers H carried by a bar I, fixed with respect to the platform D, and extending in series at a right angle or approximate right angle to the series of fingers G. The fingers H are intended to first coöperate with the breaking sweep presently described, and hence we denominate the said fingers H the primary cleaning fingers, and the fingers G the secondary cleaning fingers. It will be readily observed by reference to the drawings that the fingers G are inclined upwardly and inwardly so as to lie parallel and closely adjacent the fingers of the sweep, as said sweep fingers pass; and it will also be observed that the fingers H are inclined oppositely to the direction in which the sweep is moved, this being advantageous inasmuch as it enables the said fingers H to engage the fingers of the sweep adjacent the upper ends of the latter, and then down to the lower ends of the said fingers of the sweep, and thereby remove and throw downwardly the particles of potatoes on the sweep fingers. By reference to the dotted lines in Fig. 4 and by comparison of Figs. 1 and 2 it will be understood that the area of the platform D corresponds to about one-half the horizontal cross-section of receptacle B, and it will also be understood that the sweep, incidental to its revolutions, will first break the potatoes against the fingers F, and then force the potato portions through the openings between the fingers F, whereupon said portions will drop to the before-described foraminous bottom of the receptacle B. Then as the sweep proceeds, potato portions will be removed from its fingers, first by the fingers H and then by the fingers G, and such removed portions will also drop to the foraminous bottom of the receptacle. The fingers H are arranged such a distance apart as to afford little clearance between them and the fingers of the sweep, and this is also true of the fingers G, from which it follows that after breaking potatoes against the fingers F, the fingers of the sweep will be quickly and thoroughly cleaned before the said sweep fingers again engage the mass of potatoes, and consequently the said sweep is kept in a high state of efficiency from the start to the finish of the operation.

The before mentioned sweep for breaking the potatoes is lettered J, and is made up of a top bar *n* curved in the direction of its length and provided with a knife edge *p* adapted to cut through the mass of potatoes on the platform D, and fingers *q* depending from the said bar *n* and inclined slightly toward the rear with reference to the direction in which the sweep is moved in operation. It will also be noted that the curvature of the bar *n* is toward the rear with reference to said direction, and hence incidental to its movement above the platform D the sweep will move before it a large volume of potatoes and present the same under considerable pressure to the fingers F, with the result that potatoes will be forced between and broken by the said fingers F both before and during the passage of the fingers of the sweep between the fingers F. The curved horizontal bar of the sweep J is fixed at its inner end to a shaft K which is journaled in the aperture *k* and is equipped at its upper end with a miter gear L. The said shaft K is preferably tubular and is made to bear at its lower end on the platform D at a point between the series of breaking fingers F and the series of secondary cleaning fingers G. Intermeshed with the miter gear L is a miter gear M, carried at the inner end of a shaft N, journaled in the standards *l* on the crown bar C. We show a crank P through the medium of which the shaft N may be conveniently rotated, but it is obvious that any suitable means may be employed for applying manual or other power to the said shaft, without in any way affecting our invention.

It will be gathered from the foregoing that rotation of the shaft N will be attended by revolutions of the sweep J in a horizontal plane, and motion is also taken from the shaft N to rotate the means for mashing the potatoes and forcing the same through the openings of the open work or foraminous bottom of the receptacle. We prefer to have the said mashing and pressing means made up of a central vertical shaft R extending up into and fixedly connected with the before mentioned tubular shaft K, and four (more or less) blades S, fixed to and extending horizontally outward from the shaft R. We prefer to employ blades of the formation illustrated—*i. e.*, blades that are inclined in the direction of their width and have their lowermost edges arranged in close proximity to the foraminous bottom of the receptacle, this being advantageous inasmuch as it enables the blades to receive bodies of potatoes between themselves and the said foraminous bottom and to quickly mash the said potatoes against the bottom and through the openings therein. We also prefer to tooth two of the blades in order to promote the expeditious mashing of the potatoes, and to provide one of the blades with an upstanding sub-blade T; said sub-blade being designed to travel closely adjacent the side wall of the receptacle and scrape potatoes from the same, and being also designed to assist in a measure in the reduction of the potatoes to a mashed state.

U is a hopper through which the potatoes to be mashed are supplied to the platform. The said hopper U comprises a curved wall *t* having flanges $u$ at its lower end adapted to straddle the side wall of the receptacle B, and a flat wall $v$ having an angular flange $w$ adapted to bear on one edge of the crown bar C; and by reference to the drawings it will be observed that the said hopper is of hour-glass formation—that is to say, is reduced at an intermediate point of its height, as indicated by $x$, and is flared or gradually increased in size from said intermediate point to its upper and lower ends. By virtue of the said formation of the hopper, it will be manifest that a large volume of potatoes may be fed therethrough and to the platform D, without liability of the hopper becoming choked, which is an important desideratum inasmuch as the successful operation of the machine depends upon the supply of an adequate quantity of potatoes thereto. When the hopper U is placed upon the receptacle B and the crown bar C, the said hopper will manifestly be rigidly maintained in position by its weight and the described engagements between it and the receptacle and crown bar, and yet at the finish of a mashing operation the said hopper may manifestly be quickly and easily removed to facilitate the thorough cleaning of the machine as a whole.

During the mashing of potatoes, it is desirable to add milk or the like thereto and commingle the milk with the potatoes, and to these ends we fix with respect to the crown bar C a platform V upon which is carried a milk receptacle W having a faucet X. When the machine is to be operated the faucet X is opened to an extent that will assure the supply of a proper quantity of milk to the potatoes during the mashing of the same, and from this it follows that during the mashing operation the operator of the machine need pay no attention to the feeding of milk to the potatoes.

The operation of our improvements will be fully understood from the foregoing description, and need not be stated except to say that the potatoes are supplied in proper quantity to the hopper and are conveyed by the same to the platform D. Here the potatoes are engaged by and moved before the sweep J, and by the coöperation of the said sweep with the fingers F, the potatoes are broken, and the pieces are caused to drop to the bottom of the receptacle B. At this point the potatoes will be mashed between the revoluble blades and the foraminous bottom of the receptacle, and will be forced through the latter and caused to drop into a receptacle placed to receive the mashed potatoes. Subsequent to the passage of the fingers of the sweep between the breaking fingers F, the fingers of the sweep pass first in close proximity to the primary cleaning fingers, and then in close proximity to the secondary cleaning fingers G, and from this it follows that before getting back to the mass of potatoes on the platform D, the fingers of the sweep will be cleared of collected particles of potatoes which will drop to the bottom of the receptacle, and choking of the fingers of the sweep or the parts with which the sweep coöperates will be effectually prevented. When the mashing of potatoes is completed it is essential that the machine as a whole be thoroughly cleaned before being put away, and in order to facilitate the thorough cleaning, the frame carrying the platform D and the appurtenances thereof and the working parts is lifted as a unit from the receptacle B. With this done, the receptacle is left free of interior projections, and may be readily cleaned, and the frame and the parts carried thereby may be immersed in hot water and ready access may be gained to all of the parts to assure thorough cleaning thereof.

As before stated, the construction herein illustrated and described constitutes the best practical embodiment of our invention of which we are cognizant, but it is obvious that in the future practice of the invention such changes or modifications may be made as do not depart from the spirit of our invention as defined in the claims appended.

Having described our invention, what we claim and desire to secure by Letters-Patent, is:

1. The combination in a potato masher, of a receptacle having a foraminous bottom, a platform, of an area less than the horizontal cross-section of the receptacle, arranged in the receptacle at an intermediate point in the height thereof, a series of potato-breaking fingers fixed with respect to the platform, a revoluble sweep having fingers adapted to coöperate with the breaking fingers, a primary series of fingers and a secondary series of fingers for removing particles of potato from the fingers of the sweep; the said primary series of fingers being fixed with respect to the platform and disposed at an angle to the breaking fingers, and the secondary series of fingers being arranged in alinement with the breaking fingers and at the opposite side of the center of movement of the sweep, with reference thereto, and means connected and revoluble with the sweep for mashing the potato particles and crowding the potatoes through the openings in the foraminous bottom.

2. The combination in a potato masher, of a receptacle having a foraminous bottom, a platform, of an area less than the horizontal cross-section of the receptacle, arranged in the receptacle at an intermediate point in the height thereof, a series of potato-breaking fingers fixed to and rising from the platform at one edge thereof, a revoluble sweep having a curved bar and rearwardly inclined fingers depending therefrom and adapted to pass and coöperate with the breaking fingers, a primary series of fingers and a secondary series of fingers for removing potatoes from the fingers of the sweep; the said primary series of fingers being carried by a bar fixed to the platform and disposed at an angle to the series of breaking fingers and inclined upwardly and rearwardly, with reference to the direction in which the sweep moves, and a secondary series of fingers extending upwardly from the edge portion of the platform at the opposite side of the center of movement of the sweep, with reference to the breaking fingers, and being inclined so as to lie parallel to the sweep fingers as the same pass, and means connected and revoluble with the sweep for mashing the potato particles and crowding the potatoes through the openings in the foraminous bottom.

3. The combination in a potato masher, of a receptacle having a foraminous bottom, a platform, of an area less than the horizontal cross-section of the receptacle, secured in the receptacle, a crown bar supported on the receptacle and connected through hangers with the platform, a drive-shaft journaled in bearings on the crown bar, an upright shaft journaled in the platform and the crown bar and connected with the drive-shaft, breaking fingers rising from the edge portion of the platform, at one side of the vertical shaft, a sweep connected to and movable with the vertical shaft and having fingers adapted to coöperate with the breaking fingers, means fixed with respect to the platform for removing potatoes from the fingers of the sweep, and mashing means connected with the vertical shaft and movable over the foraminous bottom of the receptacle.

4. The combination in a potato masher, of a receptacle having a foraminous bottom, a platform, of an area less than the horizontal cross-section of the receptacle, arranged in the receptacle, a crown bar supported on the receptacle, hangers connecting the platform with the crown bar, a drive-shaft journaled in bearings on the crown bar, an upright shaft journaled in the platform and the crown bar and connected with the drive-shaft, breaking fingers rising from the edge portion of the platform, at one side of the vertical shaft, a sweep movable with the vertical shaft and having fingers adapted to coöperate with the breaking fingers, a secondary series of cleaning fingers rising from the edge portion of the platform at the opposite side of the vertical shaft, with respect to the breaking fingers, and inclined from the vertical, and a primary series of cleaning fingers fixed with respect to the platform and disposed between the breaking fingers and the secondary cleaning fingers and in the path of the sweep, and inclined from the vertical reversely to the direction in which the sweep moves, and blades connected with the vertical shaft and movable over the foraminous bottom of the receptacle.

5. The combination in a potato masher, of a receptacle having a foraminous bottom, a platform, of an area less than the horizontal cross-section of the receptacle, arranged in the receptacle, a crown bar removably arranged on the receptacle and connected with the platform, means for detachably securing the crown bar on the receptacle, a vertical shaft journaled in the platform and crown bar and carrying a sweep movable over the platform, means carried by the platform for coöperating with the sweep in breaking potatoes, means carried by the platform for removing potatoes from the sweep subsequent to the coöperation between the sweep and the first named means, a drive-shaft mounted on the crown bar and connected with the vertical shaft, and mashing means connected with the vertical shaft and movable over the foraminous bottom of the receptacle.

6. The combination in a potato masher, of a receptacle, a platform, of an area less than the horizontal cross-section of the receptacle at an intermediate point in the height thereof and adapted to support potatoes, means extending upwardly from said platform, and means movable above the platform for coöperating with the upwardly extending means on the platform to break potatoes and also adapted to force potato portions off the platform.

7. The combination in a potato masher, of a receptacle having a foraminous bottom, a platform, of an area less than the horizontal cross-section of the receptacle, arranged in said receptacle at an intermediate point in the height thereof and adapted to support potatoes, means extending upwardly from said platform, revoluble means above the platform for coöperating with the upwardly extending means on the platform to break potatoes and also adapted to force potato portions off the platform, and means revoluble with the first named revoluble means for mashing the potato portions against and through the foraminous bottom of the receptacle.

In testimony whereof we have hereunto set our hands in presence of two subscribing witnesses.

JOHN EDWARD GLOEKLER.
ALFRED B. STAHL.

Witnesses:
WM. H. BAUMANN,
JOSEPH F. KRISS.